United States Patent
Li et al.

(10) Patent No.: US 9,720,284 B2
(45) Date of Patent: Aug. 1, 2017

(54) LIQUID CRYSTAL DISPLAY AND METHOD FOR FABRICATING THE SAME AND ELECTRONIC APPARATUS

(71) Applicants: Xiamen Tianma Micro-Electronics Co., Ltd., Xiamen (CN); Tianma Micro-Electronics Co., Ltd., Shenzhen (CN)

(72) Inventors: Jing Li, Xiamen (CN); Ting Zhou, Xiamen (CN); Poping Shen, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 14/956,996

(22) Filed: Dec. 2, 2015

(65) Prior Publication Data
US 2016/0187731 A1     Jun. 30, 2016

(30) Foreign Application Priority Data
Dec. 30, 2014   (CN) .......................... 2014 1 0839923

(51) Int. Cl.
G02F 1/1337     (2006.01)
G02F 1/1343     (2006.01)

(52) U.S. Cl.
CPC .. *G02F 1/133753* (2013.01); *G02F 1/134363* (2013.01); *G02F 2001/133757* (2013.01);
(Continued)

(58) Field of Classification Search
CPC .......................................... G02F 2001/133757
See application file for complete search history.

(56) References Cited

U.S. PATENT DOCUMENTS 7,092,057 B2     8/2006  Nakanishi et al.
2005/0099573 A1*  5/2005  Kubo ................ G02F 1/134309
                                              349/146
(Continued)

FOREIGN PATENT DOCUMENTS

CN        1544983 A     11/2004
CN      101206331 A      6/2008
(Continued)

OTHER PUBLICATIONS

Chinese Application No. 201410839923.6, First Office Action issued Nov. 28, 2016.

*Primary Examiner* — Dennis Y Kim
(74) *Attorney, Agent, or Firm* — Alston & Bird LLP (57) ABSTRACT

A liquid crystal display and a method for fabricating the same, an electronic apparatus are provided. The liquid crystal display includes: a first substrate and a second substrate disposed opposite to the first substrate; and multiple pixel units disposed between the first and the substrates, where each of the pixel units includes multiple sub-pixels with different colors; where each of the sub-pixels includes a liquid crystal layer disposed between the first and second substrates, a first alignment film disposed between the first substrate and the liquid crystal layer and a second alignment film disposed between the second substrate and the liquid crystal layer; where at least two sub-pixels in a pixel unit have different alignment directions relative to the first alignment film; and an alignment direction of a sub-pixel relative to the first alignment film is parallel to an alignment direction of this sub-pixel relative to the second alignment film.

8 Claims, 7 Drawing Sheets

(52) U.S. Cl.
CPC ............ *G02F 2001/134345* (2013.01); *G02F 2001/134372* (2013.01)

(56) References Cited

U.S. PATENT DOCUMENTS

| | | | |
|---|---|---|---|
| 2007/0176872 A1* | 8/2007 | Kazuyoshi | G02F 1/134363 345/90 |
| 2008/0143930 A1* | 6/2008 | Jin | G02F 1/1323 349/96 |
| 2009/0168002 A1* | 7/2009 | Hirota | G02F 1/133555 349/126 |
| 2011/0194061 A1* | 8/2011 | Yoso | G02F 1/1323 349/139 |
| 2016/0011458 A1* | 1/2016 | Xu | G02F 1/1337 349/96 |

FOREIGN PATENT DOCUMENTS

| | | |
|---|---|---|
| CN | 101470293 A | 7/2009 |
| CN | 101699334 A | 4/2010 |
| CN | 102147549 A | 8/2011 |

\* cited by examiner

LIQUID CRYSTAL DISPLAY AND METHOD FOR FABRICATING THE SAME AND ELECTRONIC APPARATUS

CROSS-REFERENCES TO RELATED APPLICATIONS

The present application claims priority to Chinese Patent Application No. 201410839923.6, filed with the State Intellectual Property Office of People's Republic of China on Dec. 30, 2014 entitled "LIQUID CRYSTAL DISPLAY AND METHOD FOR FABRICATING THE SAME AND ELECTRONIC APPARATUS", the content of which is incorporated herein by reference in its entirety.

FIELD OF THE INVENTION

The present disclosure relates to the technical field of display, and in particular to a liquid crystal display and a method for fabricating the same, and an electronic apparatus.

BACKGROUND OF THE INVENTION

The liquid crystal display has advantages such as ultrathin thickness, larger screen display, lower power consumption, zero-radiation and higher resolution. As one of mainstream display apparatuses, the liquid crystal display is widely applied to various electronic products and has become an important tool for people in daily life and work.

Figure 1:
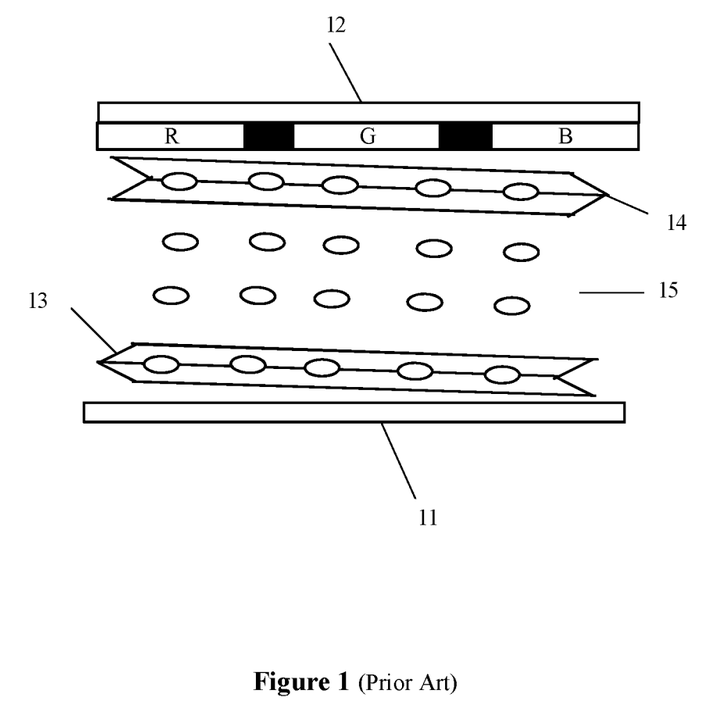
FIG. 1 is a schematic structural diagram of an existing liquid crystal display.

Referring to FIG. 1, a schematic structural diagram of an existing liquid crystal display is shown. The crystal liquid display includes an array substrate 11 and a color film substrate 12 disposed opposite to the array substrate 11; and a liquid crystal layer 15 disposed between the array substrate 11 and the color film substrate 12. Specifically, the array substrate 11 has multiple pixel units distributed in an array, and each pixel unit includes a red (R) sub-pixel, a green (G) sub-pixel and a blue (B) sub-pixel disposed together with each other. A first alignment film 13 is disposed on a surface of the array substrate 11 close to the liquid crystal layer 15. A second alignment film 14 is disposed on a surface of the color film substrate 12 close to the liquid crystal layer 15. An initial rotation angle is provided to liquid crystal molecules M in the liquid crystal layer by means of the first alignment film 13 and the second alignment film 14. The color film substrate 12 has a color film layer including a red filter film R, a green filter film G and a blue filter film B.

In the existing liquid crystal display, each of the first alignment film 13 and the second alignment film 14 has a same alignment direction relative to all the sub-pixels. In a case that the pixel unit is displayed with white light, each of the sub-pixels has a same luminance, and the luminance of the white light and the chromaticity coordinate of white spot are not adjustable.

BRIEF SUMMARY OF THE INVENTION

To solve the above-mentioned problem, a liquid crystal display and a method for fabricating the same, and an electronic apparatus are provided according to the embodiments of the present disclosure, such that in a case that the pixel unit is displayed with white light, not all the sub-pixels have the same luminance, and the luminance of the white light and chromaticity coordinate of white spot are adjustable.

For the above-described purpose, a liquid crystal display is provided according to an embodiment of the present disclosure, which includes:

a first substrate and a second substrate disposed opposite to the first substrate; and a plurality of pixel units disposed between the first substrate and the second substrate, where each of the pixel units includes multiple sub-pixels with different colors;

where each of the plurality of the sub-pixel units includes a liquid crystal layer disposed between the first substrate and the second substrate, a first alignment film disposed between the first substrate and the liquid crystal layer and a second alignment film disposed between the second substrate and the liquid crystal layer; and where at least two sub-pixels in a pixel unit have different alignment directions relative to the first alignment film; and an alignment direction of a sub-pixel relative to the first alignment film is parallel to an alignment direction of the sub-pixel relative to the second alignment film.

An electronic device is further provided according to an embodiment of the present disclosure, which includes the liquid crystal display described above.

A method for a liquid crystal display is further provided according to an embodiment of the present disclosure, which includes:

providing a first substrate, wherein the first substrate has a display surface and a backlight surface disposed opposite to the display surface;

fabricating a display unit on the display surface, wherein the display unit includes a plurality of pixel units distributed in an array, and each of the plurality of the pixel units includes a plurality of sub-pixels with different colors;

fabricating a first alignment film on a surface of the display unit, wherein at least two sub-pixels in the same pixel unit have different alignment directions relative to the first alignment film;

forming a liquid crystal layer on a surface of the first alignment film; and disposing a second substrate on a surface of the liquid crystal layer, wherein a second alignment film is disposed on a surface of the second substrate close to the display unit, and the alignment direction of a sub-pixel relative to the first alignment film is parallel to the alignment direction of this sub-pixel relative to the second alignment film.

As can be seen from the above description, the liquid crystal display according to the embodiment of the present disclosure includes: a first substrate and a second substrate disposed opposite to the first substrate, where the first substrate has a display surface and a backlight surface disposed opposite to the display surface; a display unit disposed between the first substrate and the second substrate; and a liquid crystal layer disposed between the first alignment film and the second alignment film. The display unit is disposed on the display surface and includes multiple pixels distributed in an array. A first alignment film is disposed on a surface of the display unit close to the second substrate. A second alignment film is disposed on a surface of the second substrate close to the first substrate. The pixel includes multiple sub-pixels with different colors. At least two sub-pixels in one pixel unit have different alignment directions relative to the first alignment film. The alignment direction of a sub-pixel unit relative to the first alignment film is parallel to the alignment direction of this sub-pixel unit relative to the second alignment film. Since not all the sub-pixels in one pixel unit have the same alignment directions relative to the first alignment film, sub-pixels with different colors have different luminance by setting the alignment directions of the sub-pixels with different colors and adjusting luminance of the sub-pixels, and in a case that the pixel units are displayed with white light, the luminance of the white light and the chromaticity coordinate of white spot of the pixel unit are adjusted.

The method according to the present disclosure may be applied to fabricating the above-described liquid crystal display. In the liquid crystal display, not all the sub-pixels have the same luminance, and in a case that the pixel units are displayed with white light, the luminance of the white light and the white spot color coordinate are adjustable. According to the present disclosure, when the electronic apparatus having the above-described liquid crystal display is on the display state, the white light luminance of the pixel units may be adjustable, and the chromaticity coordinate of the white spot may be displayed with partial blue light in cool tune, or displayed with partial yellow light in warm tune.

BRIEF DESCRIPTION OF THE DRAWINGS

The accompanying drawings to be used in the description of the embodiments or the conventional art will be described briefly as follows, so that the technical solutions according to the embodiments of the present disclosure or the conventional art will become clearer. It is obvious that the accompanying drawings in the following description are only some embodiments of the present disclosure. For those skilled in the art, other accompanying drawings may be obtained according to the provided accompanying drawings without any creative work.

DETAILED DESCRIPTION OF THE INVENTION

The technical solution according to the embodiments of the present disclosure will be described clearly and completely as follows in conjunction with the drawings. It is obvious that the described embodiments are only some of the embodiments according to the present disclosure. Other embodiments obtained by those skilled in the art based on the embodiments in the present disclosure without any creative work fall into the scope of the present disclosure.

As described above, in an existing liquid crystal display, all the sub-pixels have a same alignment direction, and in a case that pixel units are operated on the white light mode, all the sub-pixels have a same luminance, and white light luminance and chromaticity coordinate of white spot are not adjustable.

Figure 2:
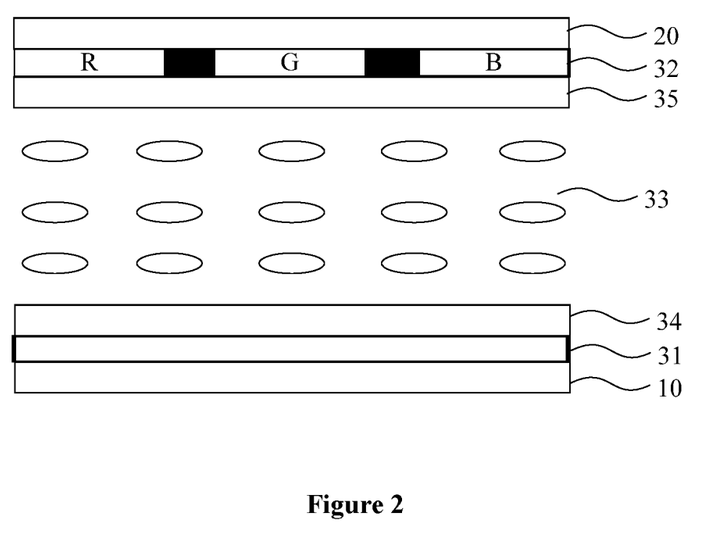
FIG. 2 is a schematic sectional structural diagram of a liquid crystal display according to an embodiment of the present disclosure.
Figure 3:
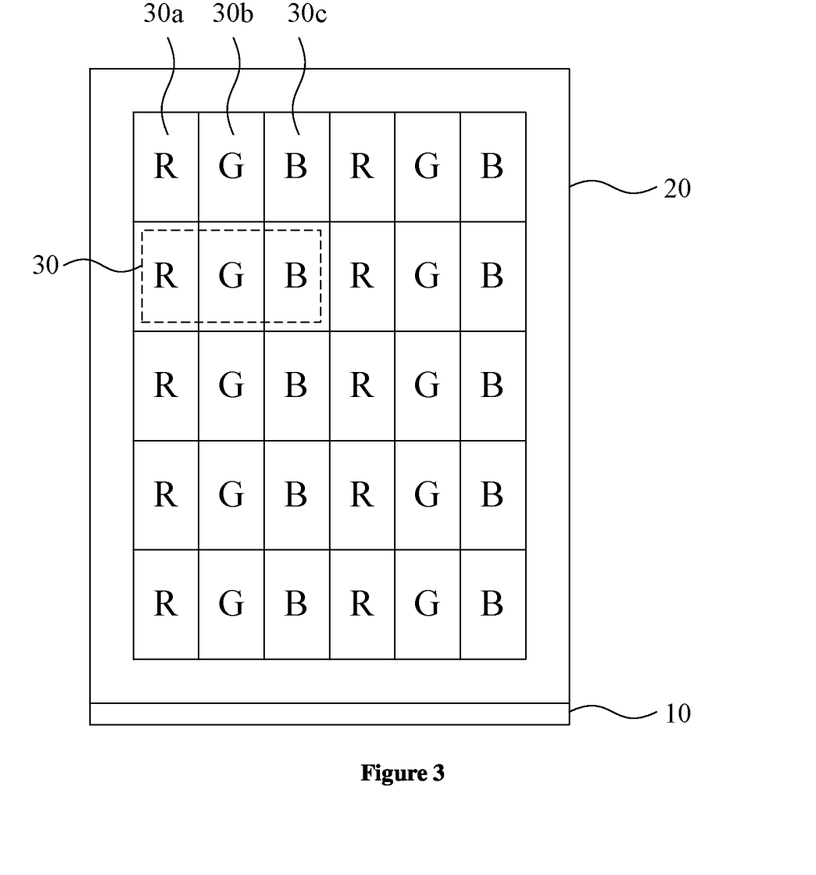
FIG. 3 is a schematic structural plan view of a liquid crystal display according to an embodiment of the present disclosure.

To solve the above-described problem, a liquid crystal display is provided in an embodiment of the disclosure. Referring to FIG. 2 and FIG. 3, FIG. 2 is a schematic sectional structural diagram of a liquid crystal display according to an embodiment of the present disclosure, and FIG. 3 is a schematic structural plan view of a liquid crystal display according to an embodiment of the present disclosure. The liquid crystal display includes: a first substrate 10 and a second substrate 20 disposed opposite to the first substrate 10; and pixel units 30 disposed between the first substrate 10 and the second substrate 20. Each pixel unit includes a plurality of sub-pixels in different colors. The sub-pixel includes a liquid crystal layer 33 disposed between the first substrate 10 and the second substrate 20, and a first alignment film 34 disposed between the first substrate 10 and the liquid crystal layer 33 and a second alignment film 35 disposed between the second substrate 20 and the liquid crystal layer 33.

Specifically, continuing to refer to FIG. 2 and FIG. 3, the first substrate 10 is disposed opposite to the second substrate 20. In this embodiment, the first substrate 10 is an array substrate, and the second substrate 20 is a color film substrate. The first substrate is a bit larger than the second substrate 20 because of circuit arrangement and other reasons. In the schematic plan view shown as FIG. 3, the first substrate 10 has a stepped surface beyond the second substrate 20.

Moreover, in this embodiment, the pixel unit 30 disposed between the first substrate 10 and the second substrate 20 includes three sub-pixels: an R sub-pixel 30a, a G sub-pixel 30b and a B sub-pixel 30c. That is, the pixel unit 30 includes three sub-pixels with different colors. Each sub-pixel includes the first alignment film 34, the liquid crystal layer 33 and the second alignment film 35. More specifically, a pixel circuit 31 is generally disposed between the first substrate 10 and the first alignment film 34. The pixel circuit 31 typically includes: a scan line, a data line, a switching element, a pixel electrode, a common electrode, etc. When a driving voltage is applied between the pixel electrode and the common electrode, an electric field may be generated in the liquid crystal layer, to drive liquid crystal molecules in the liquid crystal layer 33 to rotate. A color film layer 32 is further disposed between the second substrate 20 and the second alignment film 35. For sub-pixels with different colors, the color film layers are configured to be in different colors. And a black matrix and other elements are generally disposed between the second substrate 20 and the second alignment film 35. As should be noted, in this embodiment, the sub-pixels of 30a, 30b and 30c in a same pixel unit 30 are disposed in an RGB arrangement, that is, the three sub-pixels are in a same row. However, in another embodiment according to the present disclosure, the three sub-pixels may also be in different rows, such as a delta arrangement, that is, the three sub-pixels are in a triangular arrangement, or a pentile arrangement. The structures in this embodiment are merely explained as an example, but not meant to limit the present disclosure.

Figure 4:
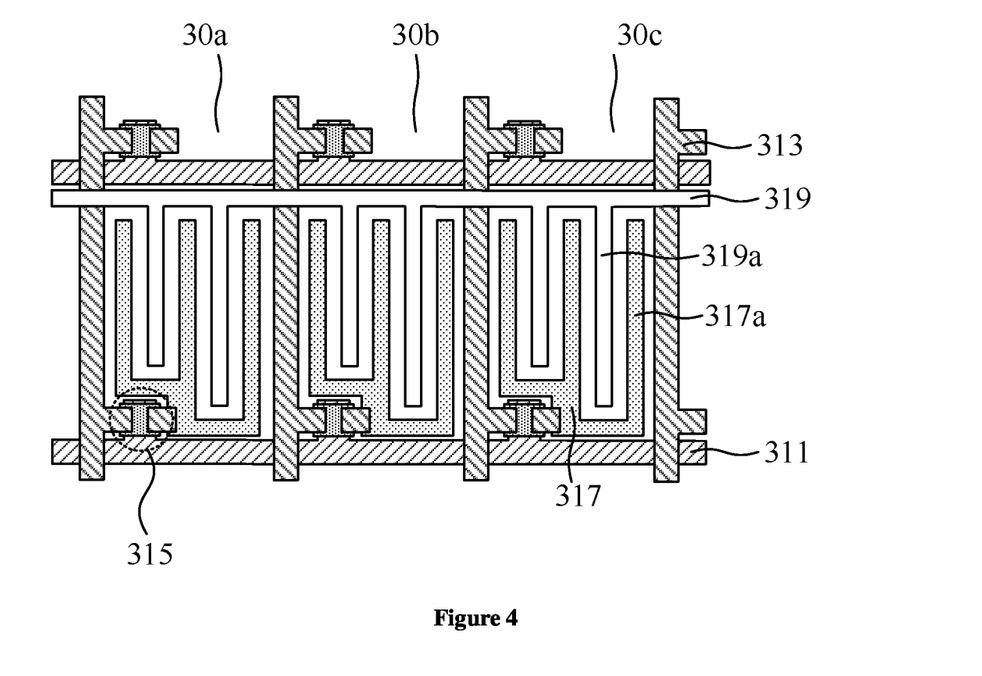
FIG. 4 is a schematic structural diagram of a pixel unit of a liquid crystal display according to an embodiment of the present disclosure.
Figure 5:
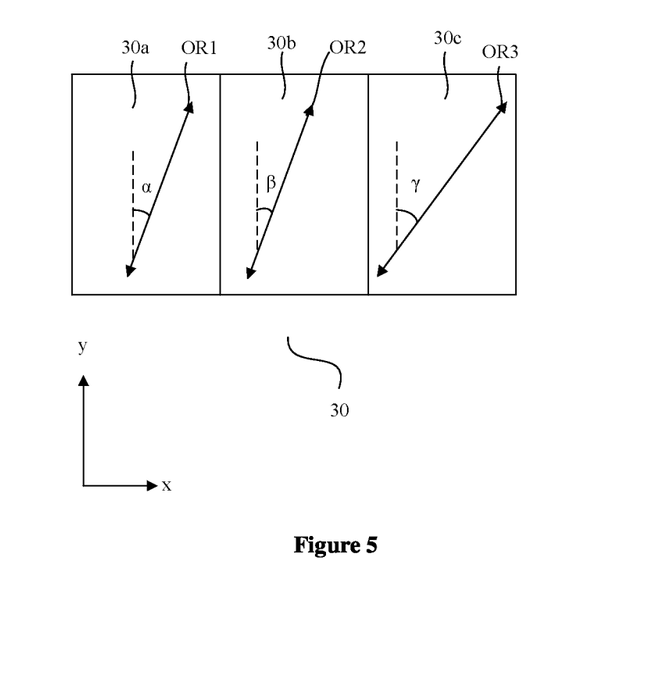
FIG. 5 is a schematic diagram of alignment directions of different sub-pixels in the pixel unit in FIG. 4.

Referring to FIG. 4 and FIG. 5, FIG. 4 is a schematic structural diagram of a pixel unit of a liquid crystal display according to an embodiment of the present disclosure, and FIG. 5 is a schematic diagram of alignment directions of different sub-pixels in the pixel unit in FIG. 4.

In conjunction with FIG. 4 and FIG. 5, in the liquid crystal display according to this embodiment, each sub-pixel has a single-domain structure, that is, each sub-pixel includes at least one strip-shaped electrode, the strip-shaped electrode is a straight-line electrode, and an extend direction of the straight-line electrode is parallel to a column direction of the array. That is, in the liquid crystal display according to this embodiment, multiple pixel units are arranged in a matrix. The pixel circuit of each sub-pixel includes scan lines 311 and data lines 313, and two adjacent scan lines 311 intersect two adjacent data lines 313 to form a sub-pixel including the switching element 315. More specifically, the switching element 315 includes a grid, a source, a drain and a semiconductor layer. The grid is electrically connected to a scan line 311, the source is electrically connected to a data line 313, and the drain is electrically connected to the pixel electrode 317. The common electrode 319 and the pixel electrode 317 are disposed insulated and opposite to each other. And in this embodiment, the common electrode 319 includes multiple strip-shaped common electrodes 319a, the pixel electrode 317 includes multiple strip-shaped pixel electrodes 317a, and the strip-shaped common electrodes 319a and the strip-shaped pixel electrodes 317a are in a straight-line shape. An extension direction of the straight-line electrode is parallel to a column direction of the pixel matrix. When a driving voltage is applied between the pixel electrode 317 and the common electrode 319, an electric field approximately parallel to the first substrate and the second substrate is generated in the liquid crystal layer, to drive the liquid crystal molecules in the liquid crystal layer to rotate.

It should be noted, this embodiment is explained by taking the pixel structure in which the common electrode and the pixel electrode each include the strip-shape electrode as an example. In practice, the pixel electrode may be a planar electrode and the common electrode may include multiple strip-shaped electrodes, or the pixel electrode may include multiple strip-shaped electrodes and the common electrode is a planar electrode, as long as the sub-pixel includes at least one strip-shaped electrode. The present disclosure should not be limited to the structure as shown in this embodiment. Additionally, the pixel electrode 317 and the common electrode 319 may be located in a same layer, or may be located in different layers. And the semiconductor layer in the switching element 315 may be a polycrystalline silicon semiconductor, an amorphous silicon semiconductor, or an oxide semiconductor, which is not defined here.

In the coordinate system as shown in FIG. 5, the y-axis is parallel to the column of the pixel matrix, and the x-axis is parallel to the row of the pixel matrix. OR is the alignment direction of each sub-pixel relative to the first alignment film, and the dotted line is parallel to the y-axis. As shown in FIG. 5, the angle between the alignment direction OR1 of the R sub-pixel 30a relative to the first alignment film and the y-axis is $\alpha$, the angle between the alignment direction OR2 of the G sub-pixel 30b relative to the first alignment film and the y-axis is $\beta$, and the angle between the alignment direction OR3 of the B sub-pixel 30c relative to the first alignment film and the y-axis is $\gamma$. Moreover, in this embodiment, since the liquid crystal molecules are driven by a horizontal electric field, the alignment direction of each of the sub-pixels relative to the first alignment film is parallel to the alignment direction of the each of the sub-pixels relative to the second alignment film.

Specifically, at least two sub-pixel units in the same pixel unit have different alignment directions relative to the first alignment film. That is, not all the angles $\alpha$, $\beta$, and $\gamma$ between the alignment directions of the at least two sub-pixels in the same pixel unit relative to the first alignment film and the column direction are the same. In case of this structure, sub-pixels have different initial directions relative to the liquid crystal molecules in the liquid crystal layer. Since the liquid crystal molecules near the first alignment film and the second alignment film have different initial directions, the first alignment film and the second alignment film apply different anchorage forces on the corresponding liquid crystal molecules in different sub-pixels. Accordingly, when a same driving voltage are applied to different sub-pixels, forces of the electrical fields are the same, the resultant force of one of the forces of the electric fields and its corresponding anchorage force differs from the resultant force of the other one of the forces of the electric fields and its corresponding anchorage force due to the difference in the anchorage forces of the alignment films. Accordingly, the liquid crystal molecules corresponding to the sub-pixels in different alignment directions finally rotate by different angles under the same electric field force. Thus those sub-pixels have different transmittances under the same electric field force. And white lights combined by sub-pixel transmitted light having different transmittances may be different, and then different white light display states may be obtained.

Continuing to refer to FIG. 4 and FIG. 5, more specifically, the liquid crystal display according to the this embodiment is displayed with white yellowish light, i.e., displayed in warm tune. In order that the pixel units of the liquid crystal display are displayed in warm tune in case of white light display, it may be assumed that in a same pixel unit, the alignment directions of the R sub-pixel and the G sub-pixel relative to the first alignment film each are set to be equal to a standard direction, and the alignment direction of the B sub-pixel is not equal to the standard direction. That is to say, $\alpha=\beta$, $\alpha$ and $\beta$ each are same to the standard angle which is between the standard direction and the column direction, and $\gamma$ is different from the standard angel. Since the pixel electrode and the common electrode are comb-shaped electrodes meshed with each other in the liquid crystal display according to this embodiment, that is, the pixel structure is the IPS (in plane switch) structure in this embodiment. Typically, for the liquid crystal display having this pixel, polarizers attached to two deviating surfaces of the first substrate and the second substrate in this liquid crystal display have vertical polarization directions. The screen is on black when no driving voltage is applied. Driving voltage of each sub-pixel is the maximum and the transmittance of the sub-pixel is the maximum when the screen is on white. In a case that the R sub-pixel 30a, the G sub-pixel 30b and the B sub-pixel 30c have a same direction, i.e., all are same to the standard angle, a same driving voltage is applied, the transmittances of the three sub-pixels are the same, and three sub-pixels are displayed with normal white light. In a case that the angle $\gamma$ between the alignment direction OR3 of the B sub-pixel 30c and the column direction is different from the standard angle, and the angle deflection of the liquid crystal molecules in the liquid crystal layer corresponding to the R sub-pixel and the G sub-pixel in normal operating voltage is the angle in white light display state, the angle deflection of the liquid crystal molecules in the liquid crystal layer corresponding to the B sub-pixel may be less than or greater than the angle in the white light display state. That is, the luminance of the B sub-pixel is weaker than the luminance of the R sub-pixel and the G sub-pixel, and the luminance of the R sub-pixel is the same as the luminance of the G sub-pixel. Consequently, when display a white screen, blue light is weak and the display image appears partial yellow. The chromaticity coordinate of white spot differs from the standard chromaticity coordinate of white spot, and shifts to yellow, to make the display image appear warm color. Specifically, the standard direction refers to the initial alignment direction with which the pixel units can switch into the white light display under the operating voltage, that is, one of the polarization directions of the two polarizers attached on the two deviating surfaces of the first substrate and the second substrate in the liquid crystal display.

With the structure of the liquid crystal display, individual requirements of users for display can be satisfied, and white light display effect and screen display effect can be achieved in the liquid crystal display obtained.

Moreover, it should be noted, this embodiment is exemplarily explained by taking the display in warm tune as an example. However, in practice, the liquid crystal display in cool tune may be obtained by adjusting the alignment direction of the sub-pixel.

In order that the pixel units of the liquid crystal display are displayed in cool tune in case of white light display, i.e., the chromaticity coordinate of white spot is displayed in partial blue light, it may be assumed that in one pixel unit that, set the alignment direction of the B sub-pixel is as the standard direction, the alignment directions of the R sub-pixel and the G sub-pixel relative to the first alignment film each are different from the standard direction. That is to say, $\gamma$ is equal to the standard angle which is between the standard direction and the column direction; $\alpha=\beta$, $\alpha$ and $\beta$ each are different from the standard angel. In case of white light display, and the deflection angle of the liquid crystal molecules in the liquid crystal layer corresponding to the B sub-pixel in normal operating voltage is the angle in white light display state, the angle deflection of the liquid crystal molecules in the liquid crystal layer corresponding to the R sub-pixel and the G sub-pixel may be less than or greater than the angle in the white light display state. That is, the luminance of each the R sub-pixel and the G sub-pixel is weaker than the luminance of the B sub-pixel, and the luminance of the R sub-pixel is the same as the luminance of the G sub-pixel. Thus when display a white screen, blue light is strong and the display image appears partial blue. The chromaticity coordinate of white spot differs from the standard chromaticity coordinate of whit spot, and shifts to blue, to make the display image appear cool color.

To avoid the problem that the display screen has mura resulted from the liquid crystal molecules rotating discontinuously, in the same pixel unit, for any two sub-pixels in the same pixel unit having different alignment directions relative to the first alignment film, a difference between alignment directions of the two sub-pixels relative to the first alignment film is greater than 0 degree and less than 10 degrees. As shown in FIG. 5, an absolute value of the difference of any two of $\alpha$, $\beta$, $\gamma$ is greater than 0 degree and less than 10 degrees.

In different pixel units, it may be set that the sub-pixels with a same color have a same alignment direction relative to the first alignment film, or it may be set that the sub-pixels with a same color have different alignment directions relative to the first alignment film. That is, in any two pixel units, the sub-pixels with a same color may have a same or different alignment directions. In this embodiment, in different pixel units, the sub-pixels with a same color have a same alignment direction relative to the first alignment film, that is, in any two pixel units, the R sub-pixels have a same direction, the G sub-pixels have a same direction, and the B sub-pixels have a same direction, which to make the luminance of image display is uniform.

Figure 6:
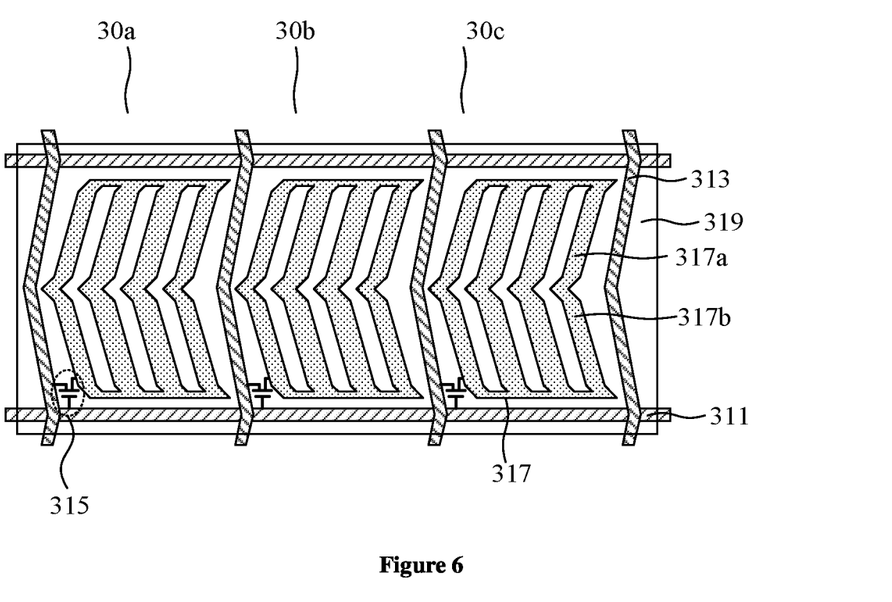
FIG. 6 is a schematic structural diagram of a pixel unit of another liquid crystal display according to an embodiment of the present disclosure.
Figure 7:
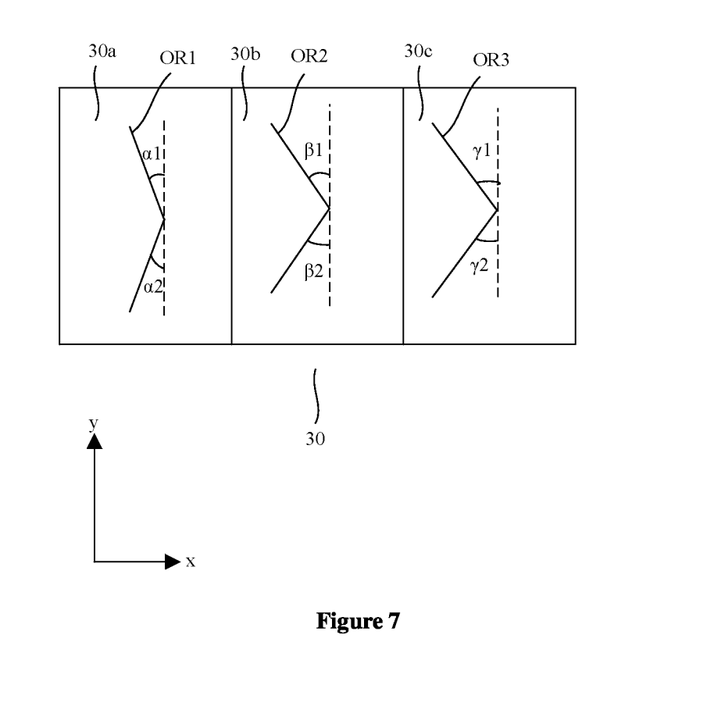
FIG. 7 is a schematic diagram of alignment directions of different sub-pixels in the pixel unit in FIG. 6.

Referring to FIG. 6 and FIG. 7, FIG. 6 is a schematic structural diagram of pixel units of another liquid crystal display according to the present disclosure, and FIG. 7 is a schematic diagram of alignment directions of different sub-pixel in a pixel unit in FIG. 6. The pixel unit includes an R sub-pixel 30*a*, a G sub-pixel 30*b* and a B sub-pixel 30*c*. Specifically, each sub-pixel has a multi-domain structure. The sub-pixel includes at least one strip-shaped electrode, the strip-shaped electrode is a broken line electrode, the broken line electrode includes a first section of straight-line electrode 317*a* and a second section of straight-line electrode 317*b*. An angle between an extend direction of the first section of straight-line electrode 317*a* and a column direction of the array is the same as an angle between an extend direction of the second section of straight-line electrode 317*b* and the column direction of the array. That is, the angle between and extend direction of the first section of straight-line electrode 317*a* and the column direction of the pixel is the same as the angle between and extend direction of the second section of straight-line electrode 317*b* and the column direction of the pixel.

Specifically, each sub-pixel includes scan lines 311 and data lines 313, and the sub-pixel including a switching element 315 is formed by two adjacent scan lines 311 intersecting two adjacent data lines. More specifically, the switching element 315 includes a grid, a source, a drain and a semiconductor layer. The grid is electrically connected to one scan line 311, the source is electrically connected to one data line 313, and the drain is electrically connected to the pixel electrode 317. A common electrode 319 and the pixel electrode 317 are disposed insulated and opposite to each other. And in this embodiment, the common electrode 319 is a planar electrode, the pixel electrode 317 includes multiple strip-shaped pixel electrodes, each of the strip-shaped pixel electrode is a broken line electrode, and the broken line electrode further includes a first section of straight-line electrode 317*a* and a second section of straight-line electrode 317*b*. An electric field approximately parallel to the first substrate and the second substrate is generated in the liquid crystal layer to drive liquid crystal molecules in the liquid crystal layer to rotate when a driving voltage is applied between the pixel electrode 317 and the common electrode 319.

It should be noted, this embodiment is explained by taking the pixel structure in which the common electrode is a planar electrode and the pixel electrode includes multiple strip-shape electrodes as an example. In practice, the pixel electrode may be a planar electrode and the common electrode may include multiple strip-shaped electrodes, or the pixel electrode and the common electrode each include multiple strip-shaped electrodes. That is, according to the present disclosure, at least one of the common electrode and the pixel electrode includes a stripe-shaped electrode. The present disclosure should not be limited to the structure as shown in this embodiment. Additionally, the semiconductor layer in the switching element 315 may be a polycrystalline silicon semiconductor layer, an amorphous silicon semiconductor, or an oxide semiconductor layer, which is not defined here.

Referring to FIG. 7, the sub-pixel having a multi-domain structure has two alignment directions relative to an alignment film, and each sub-pixel is divided into two regions.

As shown in FIG. 7, an orientation OR1 of a first alignment film relative to the R sub-pixel 30a is not along one direction as shown in FIG. 5, but two directions along a broken line. One of the two directions corresponds to the first section of the straight-line electrode 317a of the sub-pixel, and the other direction corresponds to the second section of the straight-line electrode 317b of the sub-pixel. An angle between one of the two directions and the column direction of the pixel is α1, an angle between the other of the two directions and the column direction of the pixel is α2, and α1=α2. Similarly, an orientation OR2 of the first alignment film relative to the G sub-pixel 30b is along two directions of a broken line. One of the two directions corresponds to the first section of the straight-line electrode 317a of the sub-pixel, and the other direction corresponds to the second section of the straight-line electrode 317b of the sub-pixel. An angle between one of the two directions and the column direction of the pixel is β1, an angle between the other of the two directions and the column direction of the pixel is β2, and β1=β2. An orientation OR3 of the first alignment film relative to the B sub-pixel 30a is along two directions of a broken line. One of the two directions corresponds to the first section of the straight-line electrode 317a of the sub-pixel, and the other direction corresponds to the second section of the straight-line electrode 317b of the sub-pixel. An angle between one of the two directions and the column direction of the pixel is γ1, an angle between the other of the two directions and the column direction of the pixel is γ2, and γ1=γ2.

In the embodiment as shown in FIG. 7, at least two sub-pixel units in one pixel unit have different alignment directions relative to the first alignment film, which means that not all of α1, β1, and γ1 are the same so that the intensity of white light and the chromaticity coordinate of white spot are adjustable. In case of this structure, different sub-pixels have different initial directions relative to the liquid crystal molecules in the liquid crystal layer. Since the liquid crystal molecules near the first alignment film and the second alignment film have different initial directions, the first alignment film and the second alignment film have different anchorage forces relative to the corresponding liquid crystal molecules in different sub-pixels. Accordingly, when a same driving voltage is applied to different sub-pixels, the resultant force of one of the forces of the electric fields and its corresponding anchorage force differs from the resultant force of the other one of the forces of the electric fields and its corresponding anchorage force due to the same electric field force and different anchorage forces of the alignment films. Accordingly, the liquid crystal molecules corresponding to the sub-pixels in different alignment directions finally rotate in different angles in the same electric field force. Thus those sub-pixels have different transmittances in the same electric field force. And white lights combined by sub-pixel transmitted light with different transmittances may be different, and then different white light display states may be obtained.

Moreover, similar to the embodiments according to FIG. 4 and FIG. 5 in present disclosure, in case of display in warm tune, it is required that α1 and β1 are equal to the standard angle which is between the standard direction and the column direction, and γ1 is not equal to the standard angle. In this case, in case of white light display, if the deflection angle of the liquid crystal molecules in the liquid crystal layer corresponding to the R sub-pixel and the G sub-pixel in a normal operating voltage is the angle in white light display state, the deflection angle of the liquid crystal molecules in the liquid crystal layer corresponding to the B sub-pixel may be less than or greater than the angle in the white light display state. That is, the luminance of the B sub-pixel is weaker than the luminance of the R sub-pixel and the G sub-pixel, and the luminance of the R sub-pixel is the same as the luminance of the G sub-pixel. Consequently, when display a white screen, blue light is weak and the display image appears partial yellow. The chromaticity coordinate of whit spot differs from the standard chromaticity coordinate of white spot, and shifts to yellow, to make the display image appear warm color. And preferably, in this case, α1 and β1 are 0 degree, that is, the R sub-pixel 30a and the G sub-pixel 30b have the alignment direction parallel to the column direction. In fabricating this liquid crystal display, the technology may be simplified, production efficiency may be improved, and cost may be saved. In this case, γ1 is not equal to 0 degree, and γ1 may tilt to the left of the column direction as shown in FIG. 7, or may tilt to the right of the column direction. That is, in the B sub-pixel 30c, the angle between the initial direction of the liquid crystal molecules and the strip-shaped electrode is greater than the angle between the initial direction of the liquid crystal molecules in the R sub-pixel 30a or the angle between the initial direction of the liquid crystal molecules in the G sub-pixel 30b and the strip-shaped electrode. Specifically, the standard direction in this embodiment refers to the initial alignment direction with which the pixel units can switch into the white light display under the operating voltage, that is, t one of the two polarization directions of the two polarizers attached on the two deviating surfaces of the first substrate and the second substrate in the liquid crystal display.

With the structure of the liquid crystal display, individual requirements of users for display can be satisfied, and white light display effect and screen display effect can be achieved in the liquid crystal display obtained.

Moreover, it should be noted, this embodiment is exemplarily explained by taking the display in warm tune as an example. However, in practice, the liquid crystal display in cool tune may be obtained by adjusting the alignment directions of the sub-pixels. In case of display in cool tune, it is required that α1 and β1 need are different from the standard angle, and γ1 is same to the standard angle. Those are not repeated here.

To avoid the problem that the display screen has spot resulted from the liquid crystal molecules rotating discontinuously, in one pixel unit, for any two sub-pixels in the pixel unit having different alignment directions relative to the first alignment film, a difference between alignment directions of the two sub-pixels relative to the first alignment film is greater than 0 degree and less than 10 degrees. As shown in FIG. 7, an absolute value of the difference of any two of α, β, γ is greater than 0 degree and less than 10 degrees.

In different pixel units, it may be set that the sub-pixels with a same color have a same alignment direction relative to the first alignment film, or it may be set that the sub-pixels with a same color have different alignment directions relative to the first alignment film. That is, in any two pixel units, the sub-pixels with a same color may have a same or different alignment directions. In this embodiment, it is set preferably, in different pixel units, the sub-pixels with a same color have a same alignment direction relative to the first alignment film, that is, in any two pixel units, the R sub-pixels have a same alignment direction, the G sub-pixels have a same alignment direction, and the B sub-pixels have a same alignment direction, which to make the luminance of image display is uniform.

Figure 8:
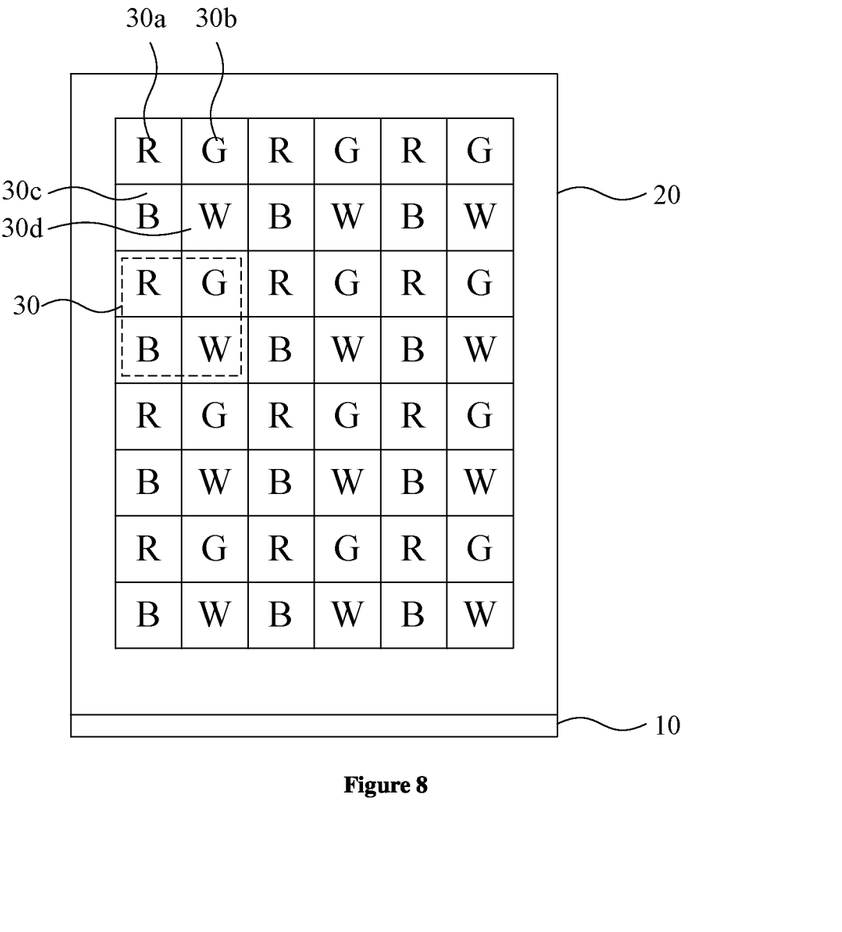
FIG. 8 is a schematic structural plan view of another liquid crystal display according to an embodiment of the present disclosure.

Reference is made to FIG. 8, which is a schematic structural plan view of another liquid crystal display according to the present disclosure. The liquid crystal display includes a first substrate 10 and a second substrate 20 disposed opposite to the first substrate 10; and pixel units 30 disposed between the first substrate 10 and the second substrate 20, each pixel unit includes a plurality of sub-pixels with different colors. Specifically, the pixel unit 30 includes four sub-pixels: an R sub-pixel 30a, a G sub-pixel 30b, a B sub-pixel 30c and a W sub-pixel 30d. Similarly, at least two sub-pixel units in one pixel unit have different alignment directions relative to the first alignment film. For the pixel units having a RGBW structure, arrangement of each sub-pixel in the same pixel unit is not limited to the arrangement as shown in FIG. 8, for example, the R sub-pixel 30a, the G sub-pixel 30b, the B sub-pixel 30c and the W sub-pixel 30d may also be in a same pixel row.

For the pixel unit having the RGBW structure, sub-pixel in the pixel unit may have a single-domain structure or a multi-domain structure. For specific structure, reference may be made to corresponding description in the pixel unit having the RGB structure, which is not repeated here. For the pixel unit having the RGBW structure, in case of display in cool tune and display in warm tune, the alignment directions of the R sub-pixel, the G sub-pixel and the B sub-pixel relative to the first alignment are the same as the alignment direction of the R sub-pixel, the G sub-pixel and the B sub-pixel in the pixel unit with the RGB structure relative to the first alignment. And the value of the alignment direction of the W sub-pixel relative to the first alignment film is set to be equal to the standard value to ensure a high luminance of the display.

It can be seen from the above description, in the liquid crystal display according to the embodiment of the present disclosure, by appropriately setting the alignment direction of the sub-pixel relative to the alignment, the chromaticity coordinate of white spot of the white light is adjustable in the case that in a case that the pixel units are displayed with white light, the alignment direction of the sub-pixel relative to the alignment is appropriately set, to make the chromaticity coordinate of white spot of the white light is adjustable and is displayed in warm tune or in cool tune; and the luminance of the white light may be set.

Figure 9:
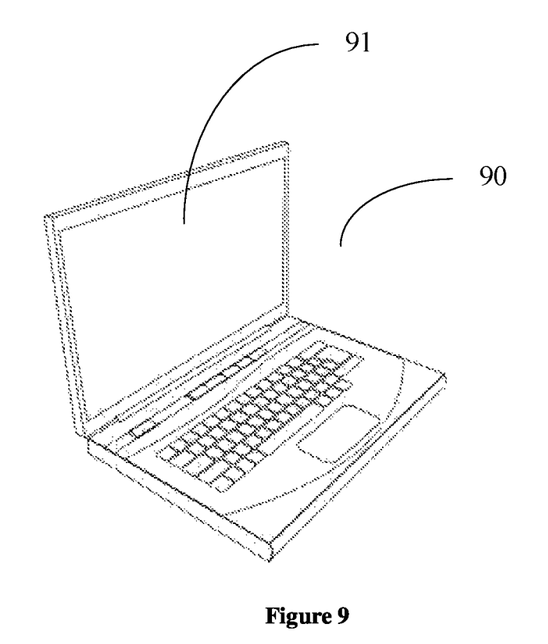
FIG. 9 is a schematic structural diagram of an electronic apparatus according to an embodiment of the present disclosure.

Reference is made to FIG. 9, which is a schematic structural diagram of an electronic apparatus 90 including a liquid crystal display 91 according to the present disclosure. The liquid crystal display 91 is the liquid crystal display as described in the above embodiment.

In this embodiment, the electronic apparatus 90 is not limited to the computer as shown in FIG. 9, and may be an electronic apparatus equipped with the liquid crystal display, such as a cell phone and a television.

The liquid crystal display as described in the above embodiment is adopted in the electronic apparatus 90 as described in this embodiment. The chromaticity coordinate of white spot and intensity of the white light may be adjustable in a case that the pixel units are displayed with the white light.

Figure 10:
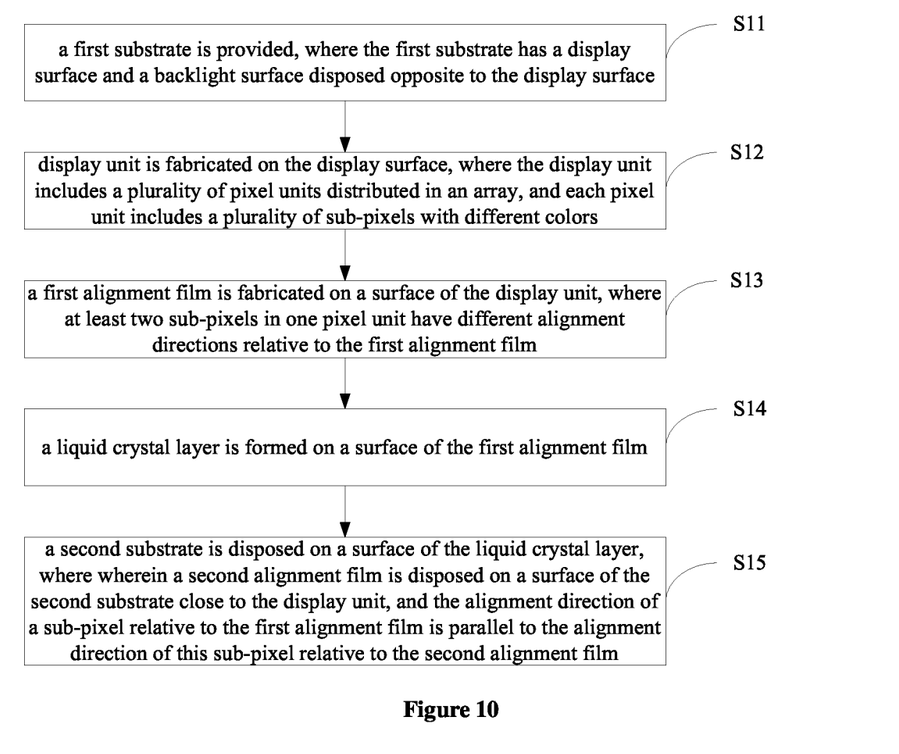
FIG. 10 is a flowchart of a method for fabricating a liquid crystal display according to an embodiment of the present disclosure.

Reference is made to FIG. 10, which is a flowchart of a method for manufacturing a liquid crystal display according to the present disclosure. The method includes the following steps S11 to S15.

In step S11, a first substrate is provided, where the first substrate has a display surface and a backlight surface disposed opposite to the display surface.

In step S12, a display unit is fabricated on the display surface, where the display unit includes a plurality of pixel units distributed in an array, and each pixel unit includes a plurality of sub-pixels with different colors.

In step S13, a first alignment film is fabricated on a surface of the display unit, where at least two sub-pixels in one pixel unit have different alignment directions relative to the first alignment film.

The alignment direction of the sub-pixels relative to the first alignment film may be set separately by optical alignment technology.

In step S14, a liquid crystal layer is formed on a surface of the first alignment film.

In step S15, a second substrate is disposed on a surface of the liquid crystal layer, where a second alignment film is disposed on a surface of the second substrate close to the display unit, and the alignment direction of a sub-pixel relative to the first alignment film is parallel to the alignment direction of this sub-pixel relative to the second alignment film.

Similarly, the alignment directions of the sub-pixels relative to the second alignment film may be set separately by optical alignment technology.

At last, for the structure of the fabricated liquid crystal display, reference may be made to the structures in drawings in embodiment of the above-described liquid crystal display.

The similarity between the method according the present disclosure and the structure embodiment of the liquid crystal display may be supplemented and explained to each other, which is not repeated here.

With the method in this embodiment, the alignment directions of the sub-pixels relative to the alignment film may be set separately by optical alignment technology such that the sub-pixels in one pixel unit have different alignment directions relative to a same alignment film, thus the chromaticity coordinate of white spot and intensity of the white light and may be adjustable. The display image may be displayed in warm tune or in cool tune.

The above descriptions of the disclosed embodiments enable those skilled in the art to implement or use the present disclosure. Various modifications made to those embodiments will be obvious to those skilled in the art, and the ordinal principles defined in the present disclosure can be implemented in other embodiments without departing from the spirit or the scope of the present disclosure. Therefore, the present disclosure should not be limited to those embodiments disclosed herein, but should be in coincidence with the widest scope in accordance with the principles and the novel characteristics disclosed in the present disclosure.

What is claimed is:

1. A liquid crystal display, comprising:
a first substrate and a second substrate disposed opposite to the first substrate; and
a plurality of pixel units disposed between the first substrate and the second substrate, wherein each of the plurality of the pixel units comprises a plurality of sub-pixels associated with different colors,
wherein each of the plurality of sub-pixels comprises a liquid crystal layer disposed between the first substrate and the second substrate, a first alignment film disposed between the first substrate and the liquid crystal layer and a second alignment film disposed between the second substrate and the liquid crystal layer;

wherein at least two sub-pixels in each of the plurality of pixel units have different alignment directions relative to the first alignment film; and an alignment direction of each of the plurality of sub-pixels relative to the first alignment film is parallel to an alignment direction of the same sub-pixel relative to the second alignment film;

wherein each of the plurality of pixel units comprises three sub-pixels of a red (R) sub-pixel, a green (G) sub-pixel and a blue (B) sub-pixel; and wherein the alignment direction of the R sub-pixel relative to the first alignment film and the alignment direction of the G sub-pixel relative to the first alignment film are the same as a set standard direction, and the alignment direction of the B sub-pixel relative to the first alignment film is different from the set standard direction.

2. The liquid crystal display according to claim 1, wherein each of the plurality of pixel units comprises a white (W) sub-pixel.

3. The liquid crystal display according to claim 1, wherein for any two sub-pixels having different alignment directions relative to the first alignment film in one of the pixel units, an angle between the alignment directions of the two sub-pixels relative to the first alignment is greater than 0 degree and less than 10 degrees.

4. The liquid crystal display according to claim 1, wherein alignment directions of the sub-pixels associated with a same color in different pixel units relative to the first alignment film are the same.

5. The liquid crystal display according to claim 1, wherein each of the plurality of sub-pixels has a single-domain structure and comprises at least one strip-shaped electrode, the strip-shaped electrode is a straight-line electrode, and an extend direction of the straight-line electrode is parallel to a column direction of an array which are formed by the plurality of the pixel units.

6. The liquid crystal display according to claim 1, wherein each of the plurality of sub-pixels has a multi-domain structure and comprises at least one strip-shaped electrode, wherein the strip-shaped electrode is a broken line electrode, the broken line electrode comprises a first section of straight-line electrode and a second section of straight-line electrode, and an angle between the extension of the first section of straight-line electrode and a column direction of an array formed by the plurality of the pixel units is the same as an angle between the extension of the second section of straight-line electrode and the column direction of the array.

7. An electronic apparatus, comprising a liquid crystal display, wherein the liquid crystal display comprises:

a first substrate and a second substrate disposed opposite to the first substrate; and a plurality of pixel units disposed between the first substrate and the second substrate, wherein each of the plurality of the pixel units comprises a plurality of sub-pixels associated with different colors;

wherein each of the plurality of sub-pixels comprises a liquid crystal layer disposed between the first substrate and the second substrate, a first alignment film disposed between the first substrate and the liquid crystal layer and a second alignment film disposed between the second substrate and the liquid crystal layer;

wherein at least two sub-pixels in each of the plurality of pixel units have different alignment directions relative to the first alignment film; and an alignment direction of each of the plurality of sub-pixels relative to the first alignment film is parallel to an alignment direction of the same sub-pixel relative to the second alignment film;

wherein each of the plurality of pixel units comprises three sub-pixels of a red (R) sub-pixel, a green (G) sub-pixel and a blue (B) sub-pixel; and wherein the alignment direction of the R sub-pixel relative to the first alignment film and the alignment direction of the G sub-pixel relative to the first alignment film are the same as a set standard direction, and the alignment direction of the B sub-pixel relative to the first alignment film is different from the set standard direction.

8. A method for fabricating a liquid crystal display, comprising:

providing a first substrate, wherein the first substrate has a display surface and a backlight surface disposed opposite to the display surface;

fabricating a display unit on the display surface, wherein the display unit comprises a plurality of pixel units distributed in an array, and each of the plurality of the pixel units comprises a plurality of sub-pixels with different colors;

fabricating a first alignment film on a surface of the display unit, wherein at least two sub-pixels in each of the plurality of pixel units have different alignment directions relative to the first alignment film;

forming a liquid crystal layer on a surface of the first alignment film; and disposing a second substrate on a surface of the liquid crystal layer, wherein a second alignment film is disposed on a surface of the second substrate close to the display unit, and an alignment direction of each of the plurality of sub-pixels relative to the first alignment film is parallel to an alignment direction of the same sub-pixel relative to the second alignment film;

wherein each of the plurality of pixel units comprises three sub-pixels of a red (R) sub-pixel, a green (G) sub-pixel and a blue (B) sub-pixel; and wherein the alignment direction of the R sub-pixel relative to the first alignment film and the alignment direction of the G sub-pixel relative to the first alignment film are the same as a set standard direction, and the alignment direction of the B sub-pixel relative to the first alignment film is different from the set standard direction.

* * * * *